US006982969B1

(12) United States Patent
Carneal et al.

(10) Patent No.: US 6,982,969 B1
(45) Date of Patent: Jan. 3, 2006

(54) METHOD AND SYSTEM FOR FREQUENCY SPECTRUM RESOURCE ALLOCATION

(75) Inventors: Bruce L. Carneal, Del Mar, CA (US); Min Zhu, San Diego, CA (US); Steven H. Bradshaw, Escondido, CA (US)

(73) Assignee: Tachyon, Inc., San Diego, CA (US)

( * ) Notice: Subject to any disclaimer, the term of this patent is extended or adjusted under 35 U.S.C. 154(b) by 0 days.

(21) Appl. No.: 09/407,645

(22) Filed: Sep. 28, 1999

(51) Int. Cl.
*H04Q 7/38* (2006.01)
(52) U.S. Cl. .................... 370/329; 370/330; 370/343; 370/478; 370/480; 455/450; 455/509
(58) Field of Classification Search ................ 370/328, 370/329, 330, 341, 343, 344, 478, 480, 484, 370/468, 477; 455/422, 450, 451, 452, 453, 455/507, 509, 517
See application file for complete search history.

(56) References Cited

U.S. PATENT DOCUMENTS

| | | | |
|---|---|---|---|
| 3,611,435 A | 10/1971 | Cooper | |
| 3,818,453 A | 6/1974 | Schmidt et al. | |
| 4,543,574 A | 9/1985 | Takagi et al. | |
| 4,545,061 A | 10/1985 | Hileman | |
| 4,555,782 A | 11/1985 | Alaria et al. | |
| 4,736,371 A | 4/1988 | Tejima et al. | |
| 4,763,325 A | 8/1988 | Wolfe et al. | |
| 4,774,707 A | 9/1988 | Raychaudhuri | |
| 4,811,200 A | 3/1989 | Wagner et al. | |
| 4,837,786 A | 6/1989 | Gurantz et al. | |
| 4,841,527 A | 6/1989 | Raychaudhuri et al. | |
| 4,868,795 A | 9/1989 | McDavid et al. | |
| 5,012,469 A | 4/1991 | Sardana | |
| 5,121,387 A | 6/1992 | Gerhardt et al. | |
| 5,159,592 A | 10/1992 | Perkins | |
| 5,166,929 A | 11/1992 | Lo | |
| 5,172,375 A | 12/1992 | Kou | |
| 5,216,427 A | 6/1993 | Yan et al. | |
| 5,239,677 A | 8/1993 | Jasinski | |
| 5,276,703 A | 1/1994 | Budin et al. | |
| 5,297,144 A | 3/1994 | Gilbert et al. | |
| 5,345,583 A | 9/1994 | Davis | |

(Continued)

FOREIGN PATENT DOCUMENTS

EP             0 026 603         4/1981

(Continued)

OTHER PUBLICATIONS

Emmanuel Kanterakis and Sorin Davidovici, "Performance of Meteor Burst Communication Using Variable Data Rates" IEEE International Conference on Communications, Bostonicc/89, Jun. 1989, pps. 1119-1123.

(Continued)

*Primary Examiner*—Alpus H. Hsu
(74) *Attorney, Agent, or Firm*—Knobbe Martens Olson & Bear LLP

(57) ABSTRACT

A system and method for allocating one or more portions of the frequency spectrum among a plurality of radio frequency (RF) transmitters and/or receivers. The system comprises a hub station that dynamically allocates the frequency spectrum in response to demand of the plurality of RF transmitters and/or receivers. Based on the demand, the hub station analyzes the state of performance of one or more groups of RF transmitters and/or receivers, and optimizes utilization of the assigned frequency spectrum.

30 Claims, 10 Drawing Sheets

U.S. PATENT DOCUMENTS

| | | | |
|---|---|---|---|
| 5,381,443 A | 1/1995 | Borth et al. | |
| 5,384,777 A | 1/1995 | Ahmadi et al. | |
| 5,420,864 A | 5/1995 | Dahlin et al. | |
| 5,471,473 A | 11/1995 | Tejima | |
| 5,485,464 A | 1/1996 | Strodtbeck et al. | |
| 5,490,087 A | 2/1996 | Redden et al. | |
| 5,537,397 A | 7/1996 | Abramson | |
| 5,539,730 A | 7/1996 | Dent | |
| 5,541,924 A | 7/1996 | Tran et al. | |
| 5,548,809 A | 8/1996 | Lemson | 455/34.1 |
| 5,550,992 A | 8/1996 | Hashimoto | |
| 5,566,168 A | 10/1996 | Dent | |
| 5,570,355 A | 10/1996 | Dail et al. | |
| 5,577,024 A | 11/1996 | Malkamaki et al. | |
| 5,579,306 A * | 11/1996 | Dent | 370/50 |
| 5,586,121 A | 12/1996 | Moura et al. | |
| 5,592,469 A * | 1/1997 | Szabo | 370/342 |
| 5,608,727 A * | 3/1997 | Perreault et al. | 370/462 |
| 5,612,703 A | 3/1997 | Mallinckrodt | |
| 5,613,195 A | 3/1997 | Ooi | |
| 5,615,212 A | 3/1997 | Ruszczyk et al. | |
| 5,638,361 A | 6/1997 | Ohlson et al. | |
| 5,642,354 A | 6/1997 | Spear | |
| 5,644,576 A | 7/1997 | Bauchot et al. | |
| 5,651,009 A | 7/1997 | Perreault et al. | |
| 5,652,892 A | 7/1997 | Ugajin | |
| 5,671,218 A | 9/1997 | I et al. | |
| 5,673,322 A | 9/1997 | Pepe et al. | |
| 5,677,909 A | 10/1997 | Heide | |
| 5,678,208 A | 10/1997 | Kowalewski et al. | |
| 5,696,903 A | 12/1997 | Mahany | |
| 5,704,038 A | 12/1997 | Mueller et al. | |
| 5,706,278 A | 1/1998 | Robillard et al. | |
| 5,732,328 A | 3/1998 | Mitra et al. | |
| 5,734,833 A | 3/1998 | Chiu et al. | |
| 5,745,485 A | 4/1998 | Abramson | |
| 5,758,088 A | 5/1998 | Bezaire et al. | |
| 5,768,254 A | 6/1998 | Papadopoulos et al. | |
| 5,774,883 A | 6/1998 | Andersen et al. | |
| 5,790,533 A | 8/1998 | Burke et al. | |
| 5,790,535 A | 8/1998 | Kou | |
| 5,790,551 A | 8/1998 | Chan | |
| 5,790,939 A | 8/1998 | Malcolm et al. | |
| 5,790,940 A | 8/1998 | Laborde et al. | |
| 5,796,726 A | 8/1998 | Hassan et al. | |
| 5,802,061 A | 9/1998 | Agarwal | |
| 5,808,760 A | 9/1998 | Gfeller | |
| 5,809,093 A | 9/1998 | Cooper | |
| 5,809,400 A | 9/1998 | Abramsky et al. | |
| 5,809,414 A | 9/1998 | Coverdale et al. | |
| 5,812,938 A | 9/1998 | Gilhousen et al. | |
| 5,815,652 A | 9/1998 | Ote et al. | |
| 5,815,798 A | 9/1998 | Bhagalia et al. | |
| 5,818,830 A | 10/1998 | Daane et al. | |
| 5,818,831 A | 10/1998 | Otonari | |
| 5,818,845 A | 10/1998 | Moura et al. | |
| 5,818,887 A | 10/1998 | Sexton et al. | |
| 5,822,311 A | 10/1998 | Hassan et al. | |
| 5,828,655 A | 10/1998 | Moura et al. | |
| 5,848,064 A | 12/1998 | Cowan | |
| 5,859,852 A | 1/1999 | Moura et al. | |
| 5,862,452 A | 1/1999 | Cudak et al. | |
| 5,872,820 A | 2/1999 | Upadrasta | |
| 5,889,766 A | 3/1999 | Ohnishi et al. | |
| 5,889,767 A | 3/1999 | Kimura | |
| 5,905,719 A | 5/1999 | Arnold et al. | |
| 5,909,447 A | 6/1999 | Cox et al. | |
| 5,910,945 A | 6/1999 | Garrison et al. | |
| 5,915,207 A | 6/1999 | Dao et al. | |
| 5,926,458 A | 7/1999 | Yin | |
| 5,946,602 A | 8/1999 | Sayegh | |
| 5,958,018 A | 9/1999 | Eng et al. | |
| 5,959,982 A | 9/1999 | Federkins et al. | |
| 5,960,001 A | 9/1999 | Shaffer et al. | |
| 5,963,557 A | 10/1999 | Eng | |
| 5,966,412 A | 10/1999 | Ramaswamy | |
| 5,966,636 A | 10/1999 | Corrigan et al. | |
| 6,122,291 A * | 9/2000 | Robinson et al. | 370/468 |
| 6,169,728 B1 * | 1/2001 | Perreault et al. | 370/235 |
| 6,658,010 B1 * | 12/2003 | Enns et al. | 370/401 |

FOREIGN PATENT DOCUMENTS

| | | |
|---|---|---|
| EP | 0 097 309 | 1/1984 |
| EP | 0 584 820 A1 | 3/1994 |
| EP | 0 722 228 A2 | 7/1996 |
| EP | 0 755 164 A2 | 1/1997 |
| EP | 0 889 660 A2 | 1/1999 |
| EP | 0 889 664 A2 | 1/1999 |
| EP | 0 831 669 A2 | 3/1999 |
| EP | 0 901 253 A2 | 3/1999 |
| EP | 0 912 015 A2 | 4/1999 |
| EP | 0 912 016 A2 | 4/1999 |
| EP | 0 913 968 A1 | 5/1999 |
| EP | 0 913 970 A1 | 5/1999 |
| EP | 0 915 592 A1 | 5/1999 |
| EP | 0 917 317 A1 | 5/1999 |
| EP | 0 920 226 A2 | 6/1999 |
| EP | 0 923 266 | 6/1999 |
| GB | 2 324 686 | 10/1998 |
| WO | 94/19530 | 9/1994 |
| WO | 95/34153 | 12/1995 |
| WO | 96/05690 | 2/1996 |
| WO | 96/11535 | 4/1996 |
| WO | 96/35271 | 11/1996 |
| WO | 97/11566 | 3/1997 |
| WO | 07/38502 | 10/1997 |
| WO | 97/37457 | 10/1997 |
| WO | 97/47158 | 12/1997 |
| WO | 97/50249 | 12/1997 |
| WO | 98/12829 | 3/1998 |
| WO | 98/12833 | 3/1998 |
| WO | 98/16046 | 4/1998 |
| WO | 98/19466 | 5/1998 |
| WO | 98/20724 | 5/1998 |
| WO | 98/23112 | 5/1998 |
| WO | 98/24250 | 6/1998 |
| WO | 98/37669 | 8/1998 |
| WO | 98/37706 | 8/1998 |
| WO | 98/44747 | 10/1998 |
| WO | 98/47236 | 10/1998 |
| WO | 98/49625 | 11/1998 |
| WO | 98/54858 | 12/1998 |
| WO | 98/54859 | 12/1998 |
| WO | 99/04338 | 1/1999 |
| WO | 99/04508 | 1/1999 |
| WO | 99/04509 | 1/1999 |
| WO | 99/04521 | 1/1999 |
| WO | 99/05828 | 2/1999 |
| WO | 99/13616 | 3/1999 |
| WO | 99//14963 | 3/1999 |
| WO | 99/16201 | 4/1999 |
| WO | 99/19996 | 4/1999 |
| WO | 99/19999 | 4/1999 |
| WO | 99/21287 | 4/1999 |
| WO | 99/21291 | 4/1999 |
| WO | 99/21296 | 4/1999 |
| WO | 99/21328 | 4/1999 |
| WO | 99/21329 | 4/1999 |
| WO | 99/21378 | 4/1999 |
| WO | 99/21381 | 4/1999 |
| WO | 99/22500 | 6/1999 |
| WO | 99/39480 | 8/1999 |
| WO | 99/40743 | 8/1999 |

OTHER PUBLICATIONS

Emmanuel Kanterakis and Sorin Davidovici, "Performance of Meteor-Burst Communication System Using Packet Messages with Variable Data Rates" IEEE Transactions on Communications, Jan. 1989, vol. 37, No. 1, pps. 6-17.

A. P. Gallois and A. M. Bock, "Variable-Data-Rate Systems Applicable to Fading Satellite Channels", Electronics Letters, An International Publication, Jul. 1987.

David D. Clark and Wenjia Fang, "Explicit Allocation of Best Effort Packet Delivery Service", pps. 1-30.

Epstein B. et al., Reservation Strategies for Multi-Media Traffic in a Wireless Environment, (1995) IEEE vol. conf. 45, pp. 165-169.

Naghshineh M. et al., QoS Provisioning in Micro-Cellular Networks Supporting Multiple Classes of Traffic (1996) Wireless Networks vol. 2 No. 3 pp. 195-203.

International Preliminary Examination Report for PCT/US00/23250 mailed on Jan. 15, 2002.

* cited by examiner

FIG. 6

| Group 32 | Group 64 | Group 128 |
|---|---|---|
| 212 | 232 | 252 |
| 214 | 234 | 254 |
| 216 | 236 | 256 |
| 218 | 238 | 258 |
| 220 | 240 | 260 |
| 222 | 242 | 262 |
| 224 |  | 264 |
| 244 |  | 266 |
| 246 |  | 268 |
|  |  | 270 |

| Group 32 | Group 64 | Group 128 |
|---|---|---|
| 212 | 232 | 252 |
| 214 | 234 | 254 |
| 216 | 236 | 256 |
| 218 | 238 | 258 |
| 220 | 240 | 260 |
| 222 | 242 | 262 |
| 224 | 244 | 264 |
|  | 246 | 266 |
|  |  | 268 |
|  |  | 270 |

700

METHOD AND SYSTEM FOR FREQUENCY SPECTRUM RESOURCE ALLOCATION

BACKGROUND OF THE INVENTION

1. Field of the Invention

The invention relates generally to wireless communication systems. More particularly, this invention relates to optimizing the allocation of the frequency spectrum among several stations of a wireless communication system.

2. Description of the Related Art

Wireless communication systems provide for the transmission and reception of voice, data, and video information among multiple stations (e.g., remote units) over radio frequency (RF) channels. The RF spectrum is limited by its very nature and, consequently, only a small portion of the spectrum can be assigned to a particular industry. Hence, in an industry such as the satellite communication or cellular telephone industries, designers are continuously challenged to efficiently allocate the limited spectrum to allow as many remote units as possible to have access to the assigned frequency spectrum.

One way of satisfying the demands of this challenge includes implementing one or more modulation techniques. Some modulation techniques, such as time division multiple access (TDMA), frequency division multiple access (FDMA), and code division multiple access (CDMA), have demonstrated an efficient spectrum utilization. Each of these access techniques is well known in the art and, hence, will not be described herein. Generally, each of these techniques provides a method of accessing a particular segment of the spectrum by multiple contending remote units (e.g., users). These techniques, however, do not account or adapt for variations in propagation conditions when allocating a particular segment of the spectrum to the multiple users. For example, in a satellite system that employs a TDMA technique, a user is typically allocated a particular periodic timeslot (on a predetermined frequency) during which the user may communicate with a hub station. To allow multiple users to communicate with the hub station, multiple non-overlapping timeslots are allocated to multiple users, respectively. In nearly every wireless system, however, signal propagation may be subject to unpredictable degradation over one or more intervals of time. Generally, there are several physical phenomena which introduce degradation in the wireless medium. For example, in satellite communication systems, signal degradation may be caused by weather conditions (e.g., rain storms) or environmental interference. In land based communication systems, signal degradation may be caused by physical phenomena, such as multipath propagation and varying distance between the transmitter and receiver. Such signal degradation adversely affects channel performance for some users, but not necessarily for others.

Moreover, these sophisticated access techniques do not accommodate for or respond to changes in the utilization of the assigned spectrum among various users. For example, during a particular interval of time one user may be in need of transmitting an amount of information that, if transmitted with the current bandwidth, may take an unreasonable length of time. During the same interval of time, another user may not have such a need and be idle. This situation is particularly common in data communication networks, such as the Internet, where data is transmitted in bursts or packets (i.e., chunks of bits) between one communication station and another. The bursty characteristic of such networks renders conventional frequency spectrum utilization inefficient.

Therefore, there is a need in the industry to dynamically allocate frequency spectrum utilization in user demand and performance, so that all users have adequate access to the assigned spectrum.

SUMMARY OF THE INVENTION

To overcome the above-mentioned limitation, the invention provides a method and system for optimizing frequency spectrum utilization. The invention provides a method of allocating at least a portion of the radio frequency (RF) spectrum among a plurality of RF transmitters. The method comprises monitoring aggregate demand of a group of transmitters within the plurality of RF transmitters. The group comprises at least one RF transmitter. The method further comprises determining, in response to the monitored demand, relative data congestion of the group of transmitters. The method further comprises allocating at least a portion of the RF spectrum from a group having a least amount of congestion to at least one of the plurality of other RF transmitters.

The invention further provides a system for allocating at least a portion of the radio frequency (RF) spectrum among a plurality of RF transmitters. The system comprises a plurality of RF transmitters each configured to transmit data over a respective RF channel. The system further comprises a hub transceiver in communication with the plurality of RF transmitters. The hub transceiver is configured to monitor the aggregate demand of a group of the plurality RF transmitters. The group comprises at least one RF transmitter. The hub transceiver is further configured to re-allocate a portion of the RF spectrum from the group of RF transmitters having a smallest aggregate demand to at least one of the plurality of other RF transmitters.

BRIEF DESCRIPTION OF THE DRAWINGS

The above and other aspects, features, and advantages of the invention will be better understood by referring to the following detailed description, which should be read in conjunction with the accompanying drawings, in which:

FIG. 6 is a table showing exemplary groups of the remote units of the wireless communication system of FIG. 2.

FIG. 7 is a table showing an exemplary change in the groups of wireless communication system of FIG. 2.

DETAILED DESCRIPTION OF THE INVENTION

The following description is not to be taken in a limiting sense, but is made merely for the purpose of describing the general principles of the invention. Like components are identified with like component numbers throughout the following description. The scope of the invention should be determined with reference to the claims.

Figure 1:
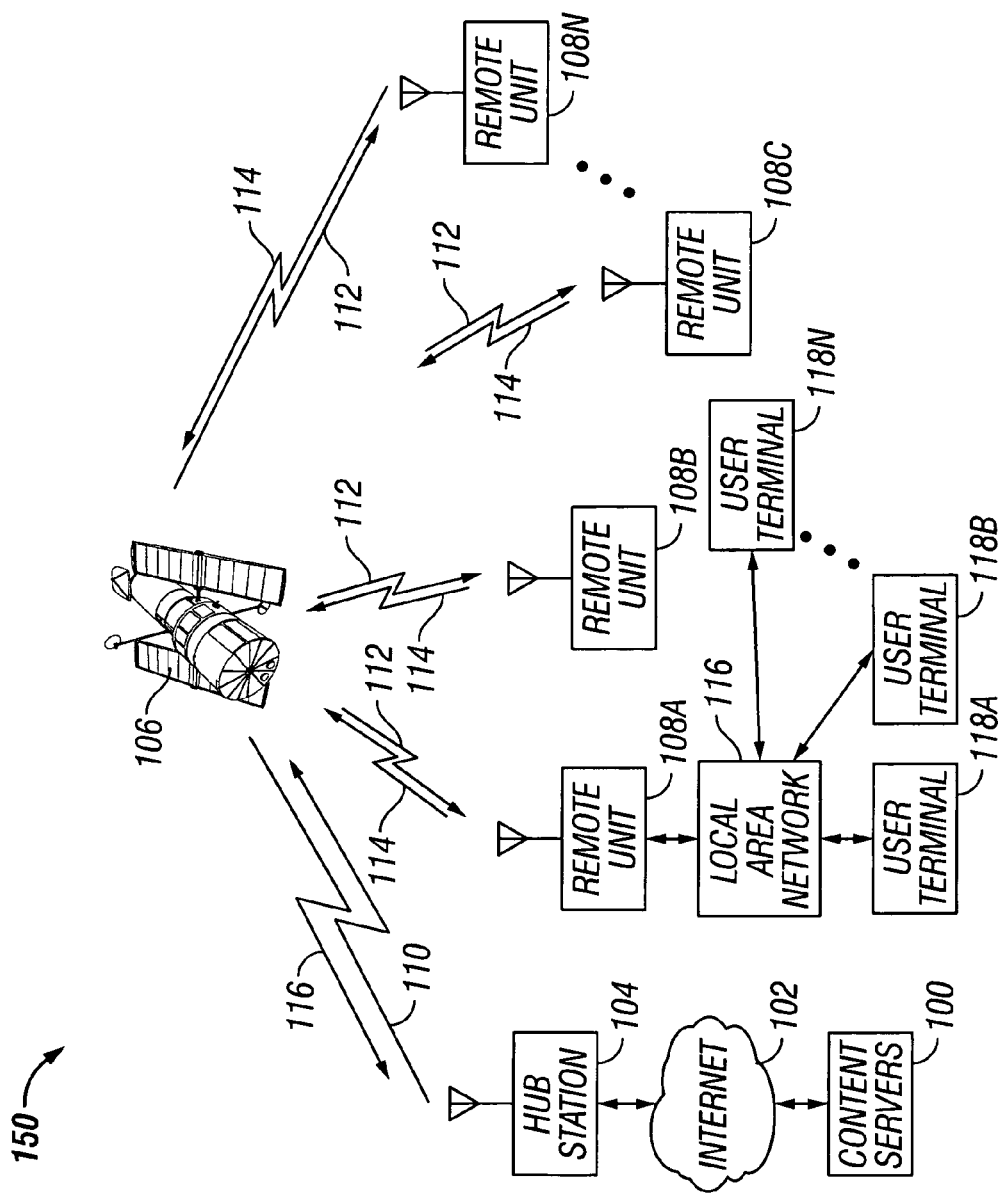
FIG. 1 is a block diagram of a typical satellite communication system in which the invention may be implemented.

FIG. 1 is a block diagram showing an exemplary system 150 in which the invention may be embodied. The system 150 provides high-speed, reliable Internet communication service over a satellite link.

In particular, the system 150 comprises on or more content servers 100 that are coupled to the Internet 102, which is in turn coupled to a hub station 104. The hub station 104 is configured to request and receive digital data from the content servers 100. The hub station 104 also communicates via a satellite 106 with a plurality of remote units 108A–108N. For example, the hub station 104 transmits signals over a forward uplink 110 to the satellite 106. The satellite 106 receives the signals from the forward uplink 110 and re-transmits them on a forward downlink 112. Together, the forward uplink 110 and the forward downlink 112 are referred to as the forward link. The remote units 108A–108N monitor one or more channels which comprise the forward link in order to receive remote-unit-specific and broadcast messages from the hub station 104.

In a similar manner, the remote units 108A–108N transmit signals over a reverse uplink 114 to the satellite 106. The satellite 106 receives the signals from the reverse uplink 114 and re-transmits them on a reverse downlink 116. Together, the reverse uplink 114 and the reverse downlink 116 are referred to as the reverse link. The hub station 104 monitors one or more channels which comprise the reverse link in order to extract messages from the remote units 108A–108N. For example, in one embodiment of the system 150, the reverse link carries multiple access channels as described in assignee's co-pending application entitled METHOD AND APPARATUS FOR MULTIPLE ACCESS IN A COMMUNICATION SYSTEM, application Ser. No. 09/407,639, filed on Sep. 28, 1999, the entirety of which is hereby incorporated by reference.

In one embodiment of the system 150, each remote unit 108A–108N is coupled to a plurality of system users. For example, in FIG. 1, the remote unit 108A is shown as coupled to a local area network 116, which in turn is coupled to a group of user terminals 118A–118N. The user terminals 118A–118N may be one of many types of local area nodes such as a personal or network computer, a printer, digital meter reading equipment or the like. When a message is received over the forward link intended for one of the user terminals 118A–118N, the remote unit 108A forwards it to the appropriate user terminal 118 over the local area network 116. Likewise, the user terminals 118A–118N can transmit messages to the remote unit 108A over the local area network 116.

In one embodiment of the system 150, the remote units 108A–108N provide Internet service to a plurality of users. For example, the user terminal 118A may be a personal computer that executes browser software in order to access the World Wide Web. When the browser receives a request for a web page or embedded object from the user, the user terminal 118A creates a request message according to well known techniques. The user terminal 118A forwards the request message over the local area network 116 to the remote unit 108A, also using well known techniques. Based upon the request message, the remote unit 108A creates and transmits a wireless link request over a channel of the reverse uplink 114 and the reverse downlink 116. The hub station 104 receives the wireless link request over the reverse link. Based upon the wireless link request, the hub station 104 passes a request message to the appropriate content server 100 over the Internet 102.

In response to the request message, the content server 100 forwards the requested page or object to the hub station 104 over the Internet 102. The hub station 104 receives the requested page or object and creates a wireless link response. The hub station transmits the wireless link response over a channel of the forward uplink 110 and forward downlink 112. For example, in one embodiment of the system 150, the hub station 104 operates as described in assignee's abandoned application entitled TRANSMISSION OF TCP/IP DATA OVER A WIRELESS COMMUNICATION CHANNEL, application Ser. No. 09/407,646, filed on Sep. 28, 1999, which is filed concurrently herewith and the entirety of which is hereby incorporated by reference.

The remote unit 108A receives the wireless link response and forwards a corresponding response message to the user terminal 118A over the local area network 116. In one embodiment of the system 150, the process of retrieving a web page or object is executed as described in assignee's application entitled DISTRIBUTED SYSTEM AND METHOD FOR PREFETCHING OBJECTS, application Ser. No. 09/129,142, filed Aug. 5, 1998, now U.S. Pat. No. 6,282,542, the entirety of which is hereby incorporated by reference. In this way, a bi-directional link between the user terminal 118A and the content servers 100 is established.

As noted above, the invention provides a method and system for optimizing frequency spectrum utilization in response to changes in demand of the remote units. There are several ways to assess the condition of a channel of a particular remote unit in a wireless system. One common way involves estimating the signal-to-noise ratio (SNR) of the signals received from the remote unit. SNR is the measure of the energy of the signal (usually expressed in decibels or dB), over a predetermined bandwidth and/or time interval, relative to the energy of the noise added to the signal. Generally, "noise" refers to the difference between the signal transmitted by one of the remote units and the signal received by the hub station 104. The higher the SNR of a channel, the better is the channel performance.

Another common way of characterizing channel performance involves estimating the bit error rate (BER) of the channel. Simply stated, BER is expressed as the fraction of the number of bits received incorrectly over the total number of bits transmitted. BER is either expressed as a percentage or, more usually, as a ratio. In effect, BER is a measure of the probability of bit error in the channel. The lower the BER, the better is the channel performance.

Figure 2:
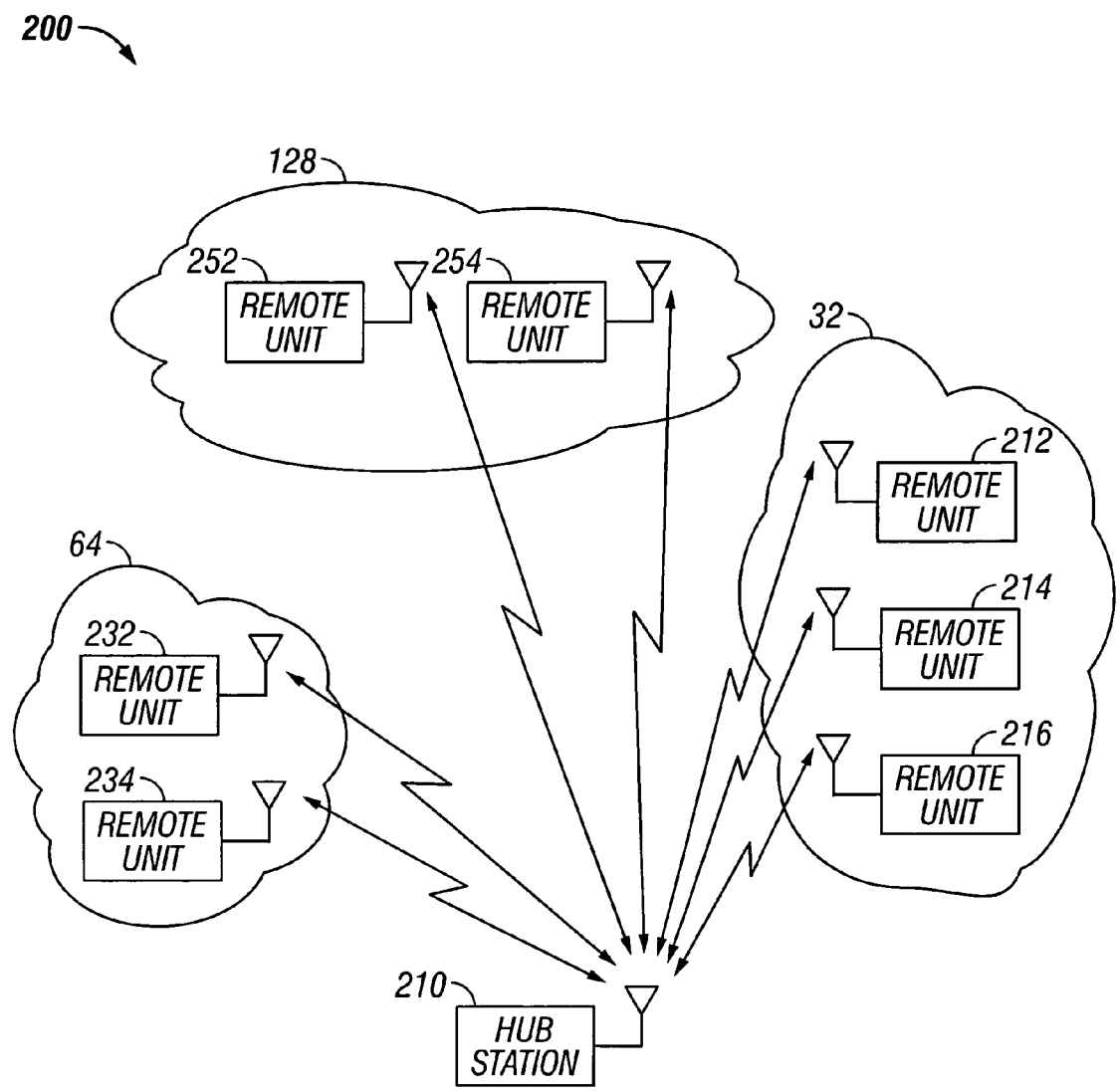
FIG. 2 is a block diagram of a wireless communication system comprising a base station and multiple remote units in accordance with the invention.

FIG. 2 shows a block diagram of a wireless communication system 200 comprising a hub station 210 and representative remote units 212, 214, 216, 232, 234, 252, and 254 in accordance with the invention. The system 200 may comprise a satellite-based wireless system (as shown in FIG. 1), or any other wireless system (e.g., mobile telephone) having multiple remote units. The system 200 may apply TDMA, FDMA, any other access technique, or a combination of access techniques to implement the invention. The number of stations in the system 200 is only illustrative and, hence, the system 200 may comprise any desired number of hub and remote stations.

The remote units are categorized into two or more operational groups of remote units (sometimes referred to as "camps" of remote units) based on the assigned data rate of each remote unit. In one embodiment, the system 200 comprises three groups of remote units: Group 32, Group 64, and Group 128. Group 32 includes one or more remote units that operate at a data rate of 32 kbps, Group 64 includes one or more remote units that operate at a data rate of 64 kbps, and Group 128 includes one or more remote units that operate at a data rate of 128 kbps. Typically, the hub station 210 determines and communicates the assigned data rate to each remote unit. For example, the hub station 210 may assign a data rate of 32 kbps to the remote units 212, 214, and 216, thereby placing these remote units in Group 32. Similarly, the hub station 210 may assign a data rate of 64 kbps to the remote units 232 and 234, thereby placing these remote units in Group 64. Finally, the hub station may assign a data rate of 128 kbps to the remote units 252 and 254, thereby placing these remote units in Group 128.

The hub station 210 determines and assigns the data rate to each remote unit based on its respective channel condition. The channel condition indicates the ability of the channel to sustain an assigned data rate while still maintaining an acceptable signal performance (e.g., SNR). In one embodiment, the hub station 210 is configured to continuously, or at predetermined time intervals, monitor the channel performance based on signals received from each of the remote units. More particularly, the hub station 210 may measure the SNR over a predetermined time interval to assess channel performance of each remote unit. The hub station 210 compares the measured SNR to predetermined SNR threshold values. The SNR thresholds may comprise a low-threshold value (e.g., 8 dB) and a high-threshold value (e.g., 11 dB). Based on this comparison, the hub station 210 determines whether to change the currently assigned data rate for each remote unit and, consequently, whether to re-categorize the remote unit from one group to another.

For example, if the measured SNR of the signals received from the remote unit 232 falls within the low and high thresholds, the hub station 210 determines that the remote unit 232 is operating at an optimal data rate and, hence, no change of the assigned data rate is necessary. If the measured SNR is above the high-threshold value, the hub station 210 determines that the channel of the remote unit 232 can sustain a higher data rate. Accordingly, the hub station 210 may instruct the remote unit 232 to raise its data rate from 64 kbps to a higher data rate, e.g., 128 kbps. If, on the other hand, the measured SNR Is below the low-threshold value, the hub station 210 determines that the channel utilization of the remote unit 232 is unacceptable and its presently assigned data rate should be reduced. Accordingly, the hub station 210 may instruct the remote unit 232 to decrease its data rate from 64 kbps to a lower data rate, e.g., 32 kbps. The hub station 210 may repeat this process to optimize channel utilization for all remote units. In one embodiment, the average transmit power at each remote unit is unaffected and maintained substantially fixed throughout this process.

In addition, the hub station 210 is configured to dynamically allocate portions of the assigned frequency spectrum to the remote units in response to changes in the demand of each remote unit. As used herein, the term "demand" refers to the amount of information (e.g., data expressed in bits) that a remote unit desires to exchange or transmit at a particular instant of time. Typically, the system 200 uses a channel, such as a reservation channel, on which each remote unit periodically, or when requested, reports or transmits its current demand to the hub station 210. In one embodiment, the hub station 210 is configured to determine the collective demand of the remote units on a group-by-group basis (hereinafter "aggregate demand"). As will be discussed in greater detail below, based at least in part on the aggregate demand of each of Groups 32, 64, and 128, the hub station 210 determines the portion of the frequency spectrum to be allocated to each of the Groups 32, 64, and 128. By so doing, the hub station 210 continuously reduces congestion and transmission delay of and optimizes the frequency utilization among the groups of remote units.

In one embodiment, it is desirable to check the quality of service (QoS) assigned to each remote unit before determining the aggregate demand of each of the Groups 32, 64, and 128. Generally, QoS may specify a nominal guaranteed throughput level (e.g., amount of data in bits) or data rate (expressed in kbps) for each remote unit. The QoS is typically assigned to each remote unit pursuant to a subscription agreement between the remote unit and the service provider, e.g., owner of the hub station 210. As used herein, the term "QoS" refers to any one or more criteria that a hub station 210 may use to classify the quality of performance committed or provided to a remote unit.

In general, the hub station 210 may use any communication parameter to allocate one or more portions of the frequency spectrum among the remote units. The communication parameter may include the aggregate demand of a group of remote units, individual demand of a single remote unit, quality of service, channel performance (e.g., SNR or BER measurements), number of remote units in a group, propagation paths (e.g., distance, terrain, etc.), any other parameters that affects performance of the wireless communication system 200, or any combination of these parameters. As further discussed below, based on the communication parameter, the hub station 210 determines the current or anticipated state of performance of the group of remote units (or a single remote unit) to allocate one or more portions of the frequency spectrum.

Figure 3:
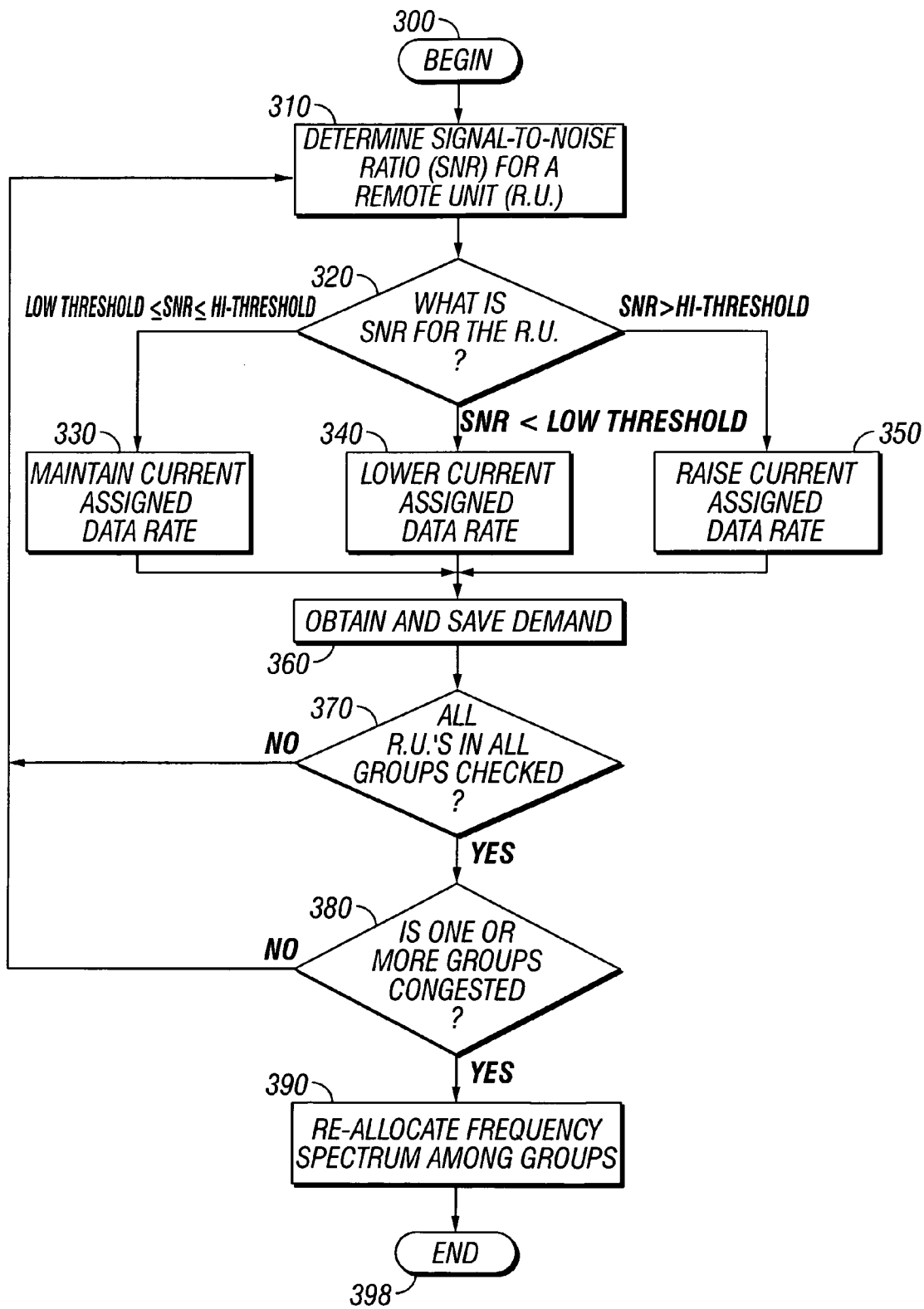
FIG. 3 is a flowchart describing the process of determining whether to allocate the frequency spectrum among two or more groups of the wireless communication system of FIG. 2.

FIG. 3 is a flowchart describing the process of determining whether to re-allocate the frequency spectrum among two or more groups of remote units of the system of FIG. 2. As noted above, in one embodiment, the remote units are categorized or distributed among Groups 32, 64, and 128. The process begins at block 330 when the system 200 initiates an algorithm to check channel performance for each remote unit. For example, the algorithm may be implemented using any microprocessor-based instructions, such as conventional firmware, programmed in, or on a device within fast access of the hub station 210. At block 310, the system 210 monitors a channel by listening for signals received from a first remote unit (e.g., the remote unit 232). In one embodiment, each remote unit may transmit signals to the hub station 210 over a predetermined or other available channel during periodic time intervals. The hub station 210 measures the energy of the signal and noise components of the signals arriving from the remote unit 232. As described above, the hub station calculates the SNR over a predetermined time interval (e.g., 100 milliseconds) for the remote unit 232.

At the decision block 320, the hub station 210 determines whether to change currently assigned data rate of the remote unit 232 based on the measured SNR. As noted above, the hub station 210 is programmed with low (e.g., 8 dB) and high (e.g., 11 dB) threshold values to compare the measured SNR. The range between the low and high thresholds represents sufficient channel performance for the currently assigned data rate. Accordingly, if the measured SNR falls within the low and high thresholds, the process proceeds to block 330 where the hub station 210 maintains the currently assigned data rate for the remote unit 232. In this case, the process continues to block 370 where the hub station 210 determines if all of the remote units in the group are checked, as described below.

The range of SNR below the low threshold value represents an undesirable channel performance where the noise level is relatively high for the currently assigned data rate. Hence, if the measured SNR falls below the low threshold value, the process proceeds to block 340 where the hub station 210 instructs the remote unit 232 to reduce its currently assigned data rate from 64 kbps to a lower data rate, e.g., 32 kbps. Thus, in such an event, the hub station 210 re-categorizes the remote unit 232 from Group 64 to Group 32. On the other hand, the range of SNR above the high threshold value represents an inefficient use of the channel where the noise level is relatively low for the currently assigned data rate. Hence, in block 320 if the measured SNR falls above the high threshold value, the process proceeds to block 350 where the hub station 210 instructs the remote unit 232 to increase its currently assigned data rate from 64 kbps to a higher data rate, e.g., 128 kbps. Thus, in such an event, the hub station 210 re-categorizes the remote unit 232 from Group 64 to Group 128.

At block 360, the hub station 210 collects one or more signals representative of the demand of the remote unit 232 over the reservation channel. The hub station 210 stores the demand in an accessible memory (not shown) for later retrieval. The timing of collection of signal may not be material to the invention and, hence, may be performed before, during, or after the SNR measurement of each remote unit. For instance, the hub station 210 may collect and save the demands of all of the remote units before initiating the process of FIG. 3. At block 370, the hub station 210 determines if the demands from all of the remote units are obtained. If the demand of more remote units is still needed, the process may return to block 310 to measure SNR of the remaining remote units and repeat the process described thus far. Alternatively, the process may return to block 360 to collect the demand of the remaining remote units over the reservation channel. In one embodiment, one or more of these steps are performed in parallel.

If, on the other hand, the demand of all of the remote units is collected, the hub station 210 determines in block 380 if one or more of the Groups 32, 64, 128 is relatively congested. This process is described in greater detail below with reference to FIG. 4. If the hub station 210 determines that no congestion is detected, the process returns to block 310 to run the entire process again. Optionally, the process may be terminated at this stage and restarted at a later time. If, on the other hand, the hub station 210 determines that one or more of the Groups 32, 64, and 128 is congested, the process proceeds to re-allocate the frequency spectrum from the least congested (i.e., best state of performance) group to the other groups. Hence, at block 390, the hub station 210 reduces the portion of the allocated frequency spectrum of the least congested group, and increases the portion of the allocated frequency spectrum of the other groups. This process is described in greater detail below with reference to FIG. 5. The process terminates at block 398.

Figure 4:
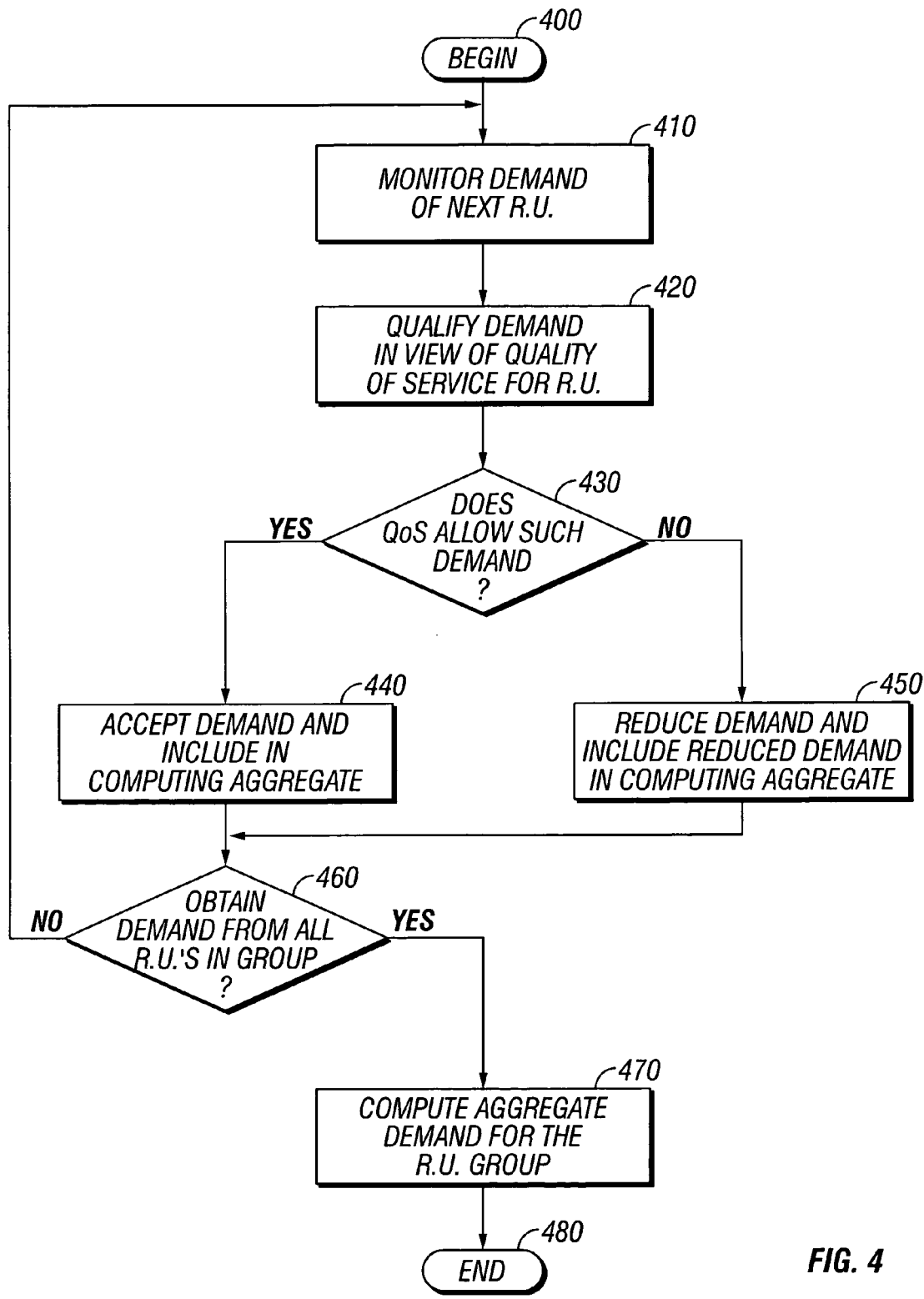
FIG. 4 is a flowchart describing the process of determining the aggregate demand of one or more groups of the wireless communication system of FIG. 2.

FIG. 4 is a flowchart describing the process executed in block 380 of FIG. 3 of determining the aggregate demand of one or more groups. The process begins with block 400. As indicated above, the hub station 210 may be configured to determine relative congestion of each of the Groups 32, 64, and 128. At block 410, the hub station 210 monitors the demand of a remote unit over the reservation channel. As noted above, the demand represents the amount of data (expressed in bits) that the remote unit desires to exchange or transmit at a particular instant of time. At block 420, the hub station 210 qualifies the received demand by checking the QoS assigned to the remote unit. The hub station 210 usually stores, or has at least access to, the QoS of each remote unit operating within its coverage area. By qualifying the demand, the hub station 210 checks the QoS of the remote unit to determine whether the QoS permits allocation of resources to satisfy the entire demand or not. Pursuant to the decision block 430, if the QoS permits satisfying the entire requested demand of the remote unit, then in block 440, the hub station 210 takes the entire demand into consideration when assessing the aggregate demand of one of the Groups 32, 64, and 128. If, on the other hand, the QoS does not permit the requested demand, the hub station 210, in block 450, determines a reduced demand (i.e., downsizes the demand) for the remote unit, and considers the reduced demand when assessing the aggregate demand of the group.

For example, the remote unit 212 may be assigned a QoS criterion that permits it to exchange up to 32 kilobits of data per second, thereby yielding an average amount of data of 1.92 (i.e., about 2) Megabits every minute. If at 12:00:00 hours, the remote unit 212 transmits 1 Megabit, the hub station 210 checks the QoS of the remote unit 212 and determines that up to about 2 Megabits is allowed. Hence, at 12:00 hours, the hub station 210 considers the entire 1 Megabit for assessing aggregate congestion for Group 32. If, however, at 12:00:30 hours (i.e., 30 seconds later), the remote unit 212 requests a demand to transmit 2 Megabits, the hub station 210 determines that, based on the QoS of the remote unit 212, a demand of only about 1 Megabit is permitted for the balance of the one minute interval, i.e., during 12:00:00–12:00:01. Accordingly, for the purpose of assessing aggregate congestion for Group 32 at 12:00:30, the hub station 210 downsizes the demand from 2 Megabits to about 1 Megabit.

For each group, the hub station 210 computes the aggregate demand of the group based on the collective demand of all of the remote units within the group. Hence, at the decision block 460, the hub station 210 checks to see if the demand was polled from all of the remote units of the group. If the demand of more remote units remains to be polled, the process returns to block 410. If, on the other hand, the hub station 210 determines that the demand was polled from all of the remote units of the group, the process proceeds to block 470. To determine the aggregate demand of a single group, the hub station 210, in block 470, adds up the demands and/or reduced demands of all of the remote units of the group. The aggregate demand represents an estimate of the (average) length of a queue of bits for the group. The hub station 210 may repeat the process for all of the Groups 32, 64, and 128, and stores the aggregate demand of all groups in its memory to perform congestion analysis. The process terminates in block 480.

Figure 5:
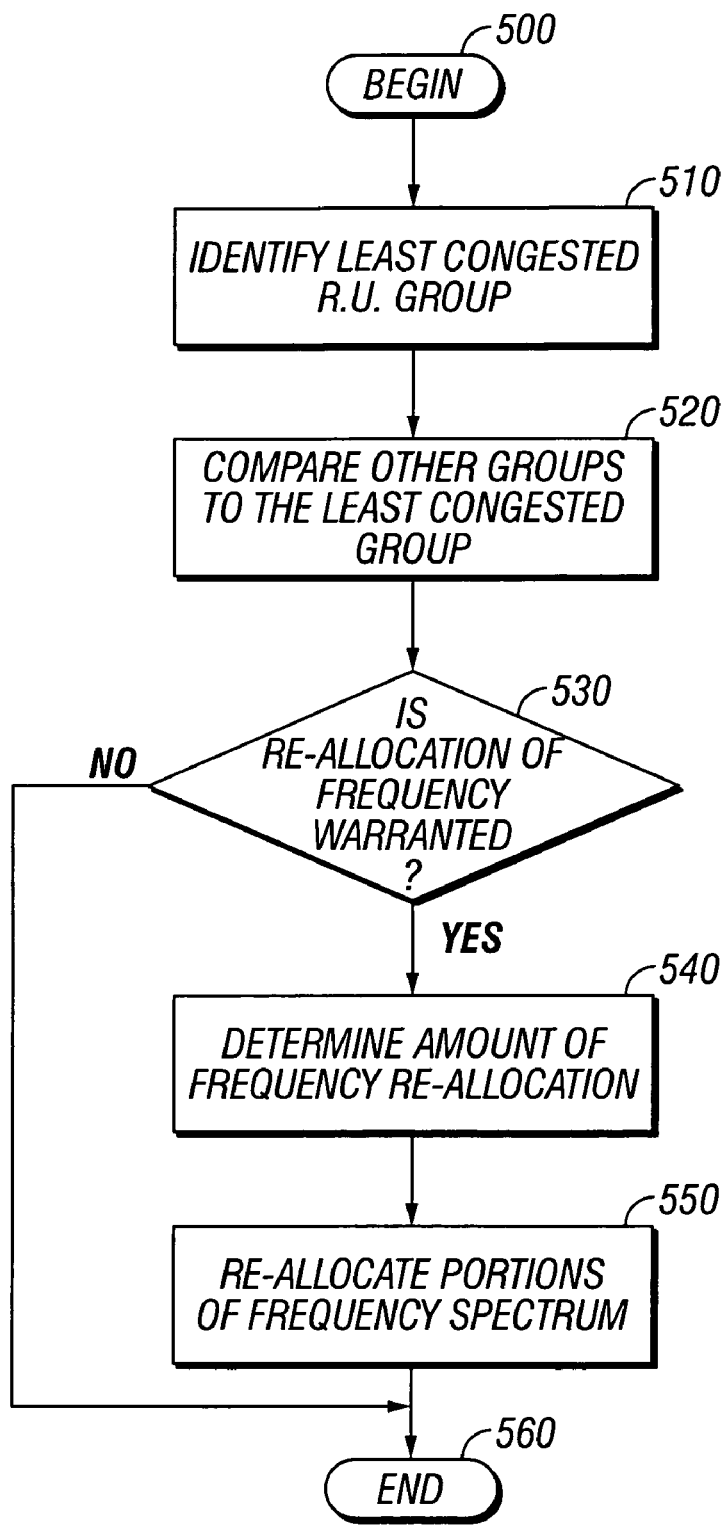
FIG. 5 is a flowchart describing the process of determining congestion and re-allocation the frequency spectrum among two or more groups of remote units of the wireless communication system of FIG. 2.

There are several ways to analyze congestion for each group of remote units. In one embodiment, the hub station 210 determines the congestion of each group relative to a least congested group. FIG. 5 is a flowchart describing the process of determining congestion and re-allocation of the frequency spectrum among two or more groups of remote units. The process begins at block 500. At block 510, the hub station 210 identifies the least congested group, which is typically the group that has the smallest queue length. Once the least congested group is identified, the hub station 210, in block 520, compares the queue length of the other groups with the queue length of the least congested group. By this comparison, the hub station may compute the percentage of excess bits by dividing the queue length of a group by the queue length of the lest congested group. The percentage of excess bits represents the extent of congestion in one group relative to the least congested group. For example, the average queue length of each of Groups 32, 64, and 128 may be 100, 300, and 250 Megabits, respectively. In this example, Group 32 having a queue length of 100 Megabits represents the least congested group. The percentage of excess bits for Group 64 is 300% (or 300/100), and for Group 128 is 250% (or 250/100). As shown by this example, the percentage of excess bits is a number that may not be smaller than 100%, because the queue length of any group is always greater than (or equal to) the queue length of the least congested group.

At block 530, the hub station 210 determines whether, based on the relative congestion of the groups, it is necessary to re-allocate a portion of the frequency spectrum from the least congested group to the other groups. In one embodiment, the hub station 210 bases its determination on the percentage of excess bits. For example, the hub station 210 may be configured to re-allocate the frequency spectrum only for the groups having a percentage of excess bits of 200% or greater. Hence, based on the above numerical example, the hub station 210 may remove portions of the frequency spectrum from Group 32 and assign it to Groups 64 and 128. Accordingly, if the re-allocation of the frequency spectrum is warranted to relieve congestion, the process proceeds to block 540. If, on the other hand, the re-allocation of the frequency spectrum is not warranted, the process terminates at block 560.

At block 540, the hub station 210 determines the amount of frequency spectrum (i.e., size of bandwidth) to be allocated from the least congested group to the other groups. Bandwidth commonly refers to the amount of data that can be transmitted in a given period over a transmission channel such as a radio transmitter. Typically, bandwidth is expressed in cycles per second (hertz or Hz) or bits per second (bps). It is desirable to minimize the amount bandwidth to be re-allocated from the least congested group to the other groups. By minimizing the amount of re-allocated bandwidth, the probability of queue oscillation and, hence, system instability is reduced. Queue oscillation commonly refers to the transfer of congestion between a least congested group and other groups back and forth, i.e., in an oscillating manner.

To minimize queue oscillation, it is desirable to reallocate the bandwidth in a stepwise fashion from the least congested group to the other groups. In one embodiment, using the stepwise fashion, the hub station 210 may reallocate bandwidth in unit increments to the higher congested groups. For example, using the above numerical example, the hub station 210 may re-allocate a bandwidth of 64 kbps from Group 32 to Group 64, and a bandwidth of 128 kbps from Group 32 to Group 128. The purpose of reallocating the bandwidth is to relieve congestion in the groups having greater congestion. Accordingly, at block 550, the hub station 210 re-allocates portions of the frequency spectrum from the least congested group to the other groups. The re-allocation process terminates at block 560.

In one embodiment, the hub station 210 continuously, or during predetermined time intervals, repeats the process of FIG. 5. The relief of congestion in the other groups may increase likelihood of congestion in the least congested group. However, the ability of the hub station 210 to continuously monitor group congestion, and re-distribute the assigned frequency spectrum among the groups of remote units, reduces the likelihood of congestion in a single group. Moreover, the continuous monitoring and re-allocation of the frequency spectrum optimizes frequency utilization among the remote units.

FIG. 6 is a table showing exemplary groups of the remote units of FIG. 2. As noted above, the hub station 210 assigns each remote unit to a camp or group based on the data rate assigned to each remote unit. In the table 600, the hub station 210 assigns a data rate of 32 kbps to remote units 212–224 and 244–246 and, thus, these remote units belong to Group 32. Similarly, the hub station 210 assigns a data rate of 64 kbps to remote units 232–242 and, thus, these remote units belong to Group 64. Finally, the hub station 210 assigns a data rate of 128 kbps to remote units 252–270 and, thus, these remote units belong to Group 128. As noted above, the data rate is generally assigned to each remote unit based on its channel performance, e.g., the measured SNR of the signals transmitted from each remote unit and received at the hub station 210. As explained above, if the SNR falls within an optimal range, the currently assigned data rate of the remote unit is maintained. If the SNR falls below a low or above a high threshold value, the data rate of the remote unit is reduced or increased accordingly. The hub station 210 maintains the table 600 in memory, or within easy access, to keep track of and update each group of remote units.

FIG. 7 is a table showing an exemplary change in the Groups 32, 64, and 128. In this embodiment, the table 700 shows that the remote units 244 and 246 no longer belong to Group 32, but now belong to Group 64. Typically, a change in the grouping of the remote units 244 and 246 indicates that the measured SNR of the channel of each of the remote units 244 and 246 falls above the high threshold value. In that case, the hub station 210 instructs the remote units 244 and 246 to increase their respective data rates from 32 to 64 kbps. Accordingly, the hub station 210 updates the table 600 to the table 700, which shows that the remote units 244 and 246 belong to Group 64.

Figure 8:
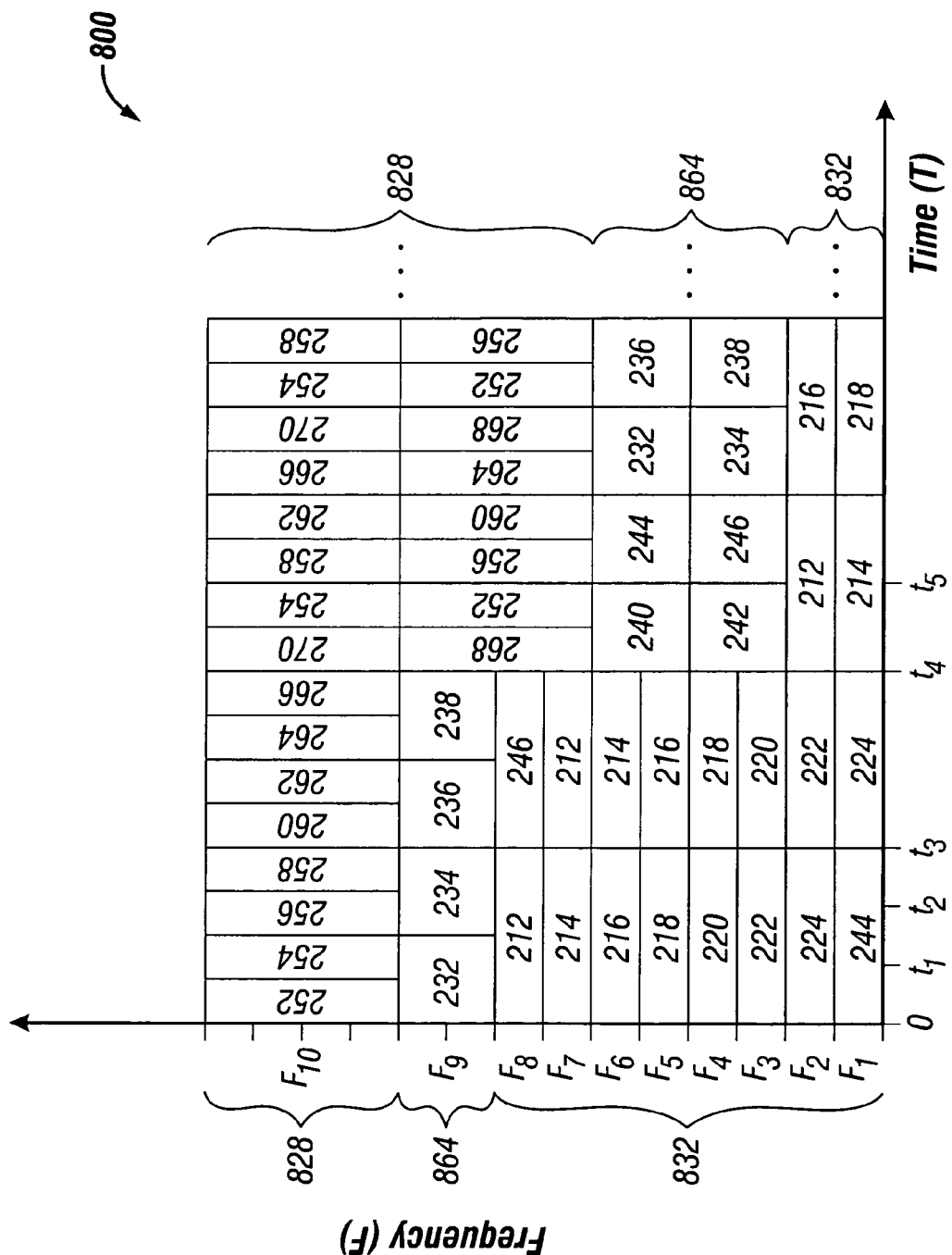
FIG. 8 is a graphical representation of one embodiment of the process of re-allocating the frequency spectrum among the remote units as a function of frequency and time.

FIG. 8 is a graphical representation of the process of re-allocating the frequency spectrum among the remote units as a function of frequency and time. The graph 800 includes a vertical axis that represents the portions of the frequency spectrum (e.g., bandwidth) assigned to each group. More particularly, the graph 800 shows that the bandwidth 832 is assigned to Group 32, bandwidth 864 is assigned to Group 64, and bandwidth 828 is assigned to Group 128. The graph 800 also includes a horizontal axis that represents the time domain T. Beginning at T=0, the graph 800 shows that the time interval during which each remote unit may communicate is represented by a box (or timeslot) marked by the remote unit number.

For example, during the time interval $0-t_3$, the graph 800 shows that the remote unit 212 is allocated a timeslot 212 and carrier frequency $F_8$, and is operating in Group 32 at a data rate of 32 kbps. During the same time interval $0-t_3$, the graph 800 shows that the remote unit 214 is allocated the timeslot 214 and carrier frequency $F_7$, and is operating in Group 32 at a data rate of 32 kbps. During the time interval $0-t_2$, the graph 800 shows that the unit 232 is allocated a timeslot 232 and carrier frequency $F_9$, and is operating in Group 64 at a data rate of 64 kbps. During the time interval 0–$t_1$, the graph 800 shows that the remote unit 252 is allocated a timeslot 252 and carrier frequency $F_{10}$, and is operating in Group 128 at a data rate of 128 kbps.

In this embodiment, it can be seen that the duration of the timeslot for the remote units of Group 32 is twice as long as the timeslot for the remote units of Group 64, and four times as long as the timeslot for the remote units of Group 128. The relationship between the duration of the timeslots among the various groups is typically a function of the assigned data rate. For example, because the data rate of 64 kbps is twice the data rate of 32 kbps, it is expected that the duration of the timeslot of Group 64 will be half the duration of the timeslot of Group 32. This timeslot/frequency structure simplifies the implementation of TDMA and FDMA systems having various operating data rates. Finally, it can also be seen that, in all of the groups, each remote unit does not occupy more than a single timeslot concurrently. The occupation of a single timeslot simplifies the operation of single-channel transceiver systems. Once the portion of the frequency spectrum for each group is determined, the hub station 210 may assign one or more timeslot/frequency to a particular remote unit (within a group) using any standard implemented in the hub station 210. Additional details concerning the transmission of channel assignment information to a plurality of remote units are disclosed in assignee's application entitled SYSTEM AND METHOD FOR EFFICIENT CHANNEL ASSIGNMENT, application Ser. No. 09/407,640, filed Sep. 28, 1999, now U.S. Pat. No. 6,532,220, the entirety of which is hereby incorporated by reference. The invention is not limited to only such systems, but may be implemented using any timeslot/frequency structure that is compatible with the characteristics of the invention.

The graph 800 illustrates an exemplary change in respective bandwidth among the groups in response to the hub station's decision to re-allocate the assigned frequency spectrum. As shown in FIG. 8, at time T=$t_4$, the hub station 210 changes the frequency spectrum allocation among the groups of remote units. More particularly, the graph 800 shows that each of the bandwidths 828 and 864 is doubled in size, and the bandwidth 832 is reduced accordingly. Hence, instead of availing only a single timeslot to Group 128 before T=$t_4$, two concurrent timeslots are available to the remote units of Group 128 after T=$t_4$. For example, as of time T=$t_4$, it can be seen that the remote units 270 and 268 are concurrently communicating at an assigned data rate of 128 kbps (Bandwidth 828). Similarly, instead of availing only a single timeslot to Group 64 before T=$t_4$, two concurrent timeslots are available to the remote units of Group 64 after T=$t_4$. For example, as of time T=$t_4$, it can be seen that the remote units 240 and 242 are concurrently communicating at an assigned data rate of 64 kbps (Bandwidth 864). On the other hand, instead of availing eight concurrent timeslots to Group 32 before T=$t_4$, only two concurrent timeslots remain available to the remote units of Group 32 after T=$t_4$. This illustration shows that, in response to the relative congestion of each of the Groups 64 and 128, the hub station 210 has determined that such congestion warrants frequency re-allocation from the least congested Group 32 to Groups 64 and 128, as explained in detail above.

Furthermore, the graph 800 illustrates an exemplary change in the data rate of one or more remote units. As shown in FIG. 8, it can be seen that before T=$t_5$, each of the remote units 244 and 246 was operating in Group 32 (Bandwidth 832) at a data rate of 32 kbps, as shown by timeslots 244 and 246 of Group 32. After time T=$t_5$, however, the remote units 244 and 246 are operating in Group 64 (Bandwidth 864) at a data rate of 64 kbps, as shown by timeslots 244 and 246 of Group 64. Hence, the graph 800 demonstrates that, sometime during the interval $t_4$–$t_5$, the hub station 210 determined to change the assigned data rate of remote units 244 and 246 from 32 to 64 kbps. As explained in detail above, the hub station 210 bases its determination on the measured SNR for the channel of each of the remote units 244 and 246. In this example, the SNR falls above a high threshold value (e.g., 11 dB), thereby warranting an increase in data rate. Accordingly, the hub station 210 instructs the remote units 244 and 246 to raise their respective data rates.

Figure 9:
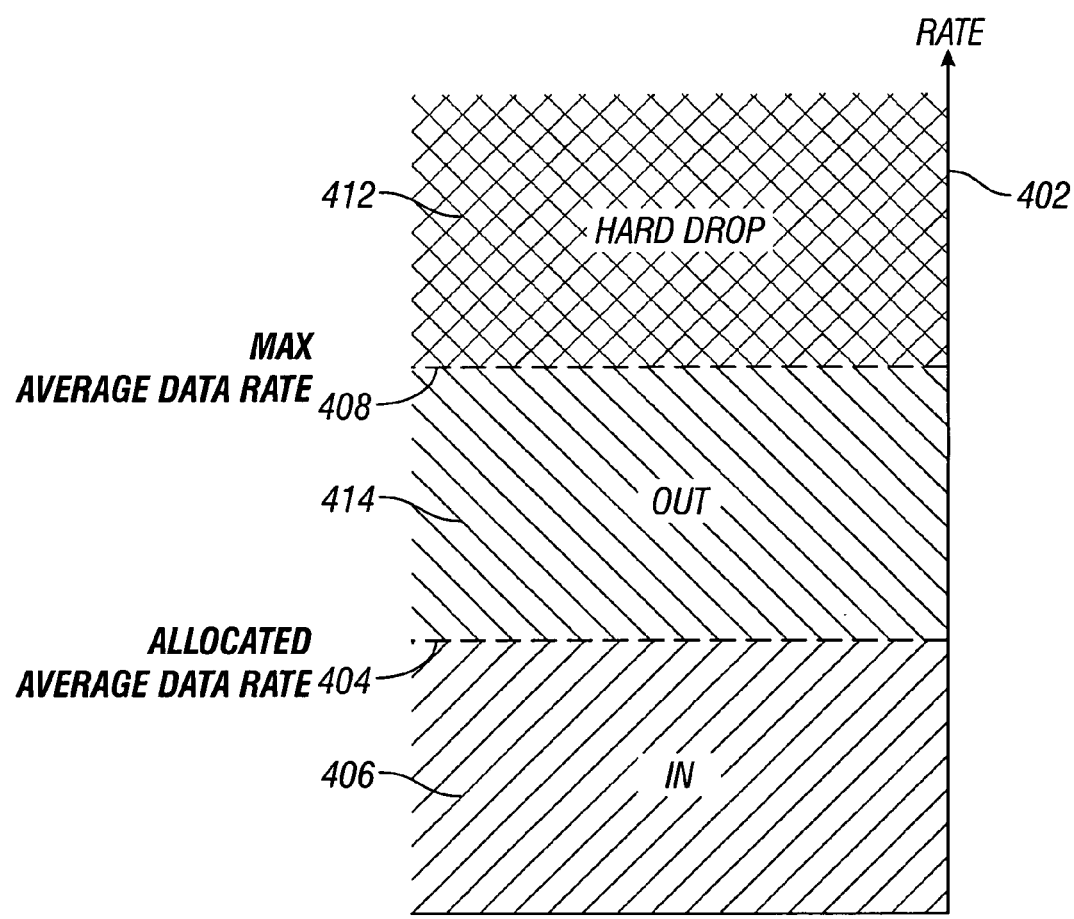
FIG. 9 is a graphical representation of three regions of quality of service operating regions for a remote unit.

In another embodiment of the invention, the reverse link resources are not pre-assigned to particular camps of remote units. FIG. 9 is an exemplary graphical representation of the three quality of service operating regions for a particular remote unit, e.g., remote unit 212 (see FIG. 2) which operates in such an environment. As noted above, the QoS is typically allocated to each remote unit pursuant to a subscription agreement between the remote unit and the service provider. Independent of the assigned data rate, the QoS specifies an allocated average data rate. While the assigned data rate specifies the rate at which the remote unit is capable of transmitting information over the channel when the remote unit is allocated a resource, the allocated average data rate reflects the average data rate over some extended period which the remote unit has, for example, purchased from the service provider. For example, if a remote unit has an assigned data rate of 256 kbps and an allocated average data rate of 32 kbps, although the remote unit transmits in bursts at a rate of 256 kbps, the bursts are dispersed in time by idle periods which reduce the average data transfer rate of the remote unit to about 32 kbps. In other words, the average duty cycle of this remote unit's transmission is at most about one-to-eight.

FIG. 9 shows a vertical axis 402 representing a range of current average data rates for the remote unit 212. Pursuant to its agreement, the remote unit 212 has subscribed for an allocated average data rate 404 (e.g., 32 kbps). Average data rates below this value are represented by an IN region 406. In one embodiment, it may be desirable to allow the remote unit 212 to exceed its allocated average data rate 404, and permit operation in an OUT region 414. The OUT region 414 represents a range of average data rates at which the remote unit 212 may operate above its allocated average data rate 404. Hence, the OUT region 414 represents average data rates ranging from the allocated average data rate 404 to a maximum average data rate 408 (e.g., 48 kbps). As further shown in FIG. 9, a HARD DROP region 412 represents average data rates above the maximum average data rate 408.

In one embodiment, the allocated average data rate 404 is associated with a particular remote unit in accordance with a subscription agreement between the remote unit operator and the owner of operator of the hub station. For example, a service provider may wish to reduce the operating costs associated with providing Internet services by purchasing a relatively low allocated average data rate 404. As the number of subscribers and the demand on the system increases, the service provider may purchase a higher allocated average data rate 404, presumably at a greater cost.

The quality of service levels 404 associated with remote units are stored by hub station. In one embodiment, the hub station includes tables that store a remote unit identifier and an associated allocated average data rate 404. In one embodiment, the tables are updated by the hub station operator when subscription information is added or modified.

Each hub station stores a range parameter that is used to define the date rate by which a transmission from a remote unit can exceed the allocated average data rate 404. The range parameter defines the size of the OUT region 414 by providing the value for the maximum average data rate 408. The range parameter may be selected based on typical system use, the capacity of the hub station, and other factors. The use of the maximum average data rate artificially limits the average data rate of a remote unit even if system resources are available, thus encouraging the purchase of a higher allocated average data rate. In other embodiments, the same mechanisms may be employed to limit the maximum average data rate pursuant to other motives.

In this embodiment, the invention provides a method and system of scheduling remote unit communications of the system 200 within the available communication resources. As noted above, the hub station 210 may continuously receive demand of each of the remote units over the reservation channel. In this embodiment, the hub station 210 arranges each arriving demand in a queue on a first in first out (FIFO) basis.

In one embodiment, the hub station 210 categorizes or classifies each remote unit demand based, at least in part, on the current average data rate for the remote unit over some previous period of time. As indicated above, the hub station 210 may compute a current average data rate based on a moving average over a predetermined time interval (e.g., 10, 30, 60 seconds, or other desired interval). The moving average is determined by dividing the amount of data transmitted during a predetermined past time interval by the predetermined time interval.

For example, assume that a remote unit has an allocated average data rate of 48 kbps, a maximum average data rate of 60 kbps and that the hub station uses a predetermined time interval of 60 seconds for determining the remote unit's average data rate. Further, assume that, after a long period of idleness, at 12:00:01, the remote unit 212 completes a transfer of 1 Megabit of data. Hence, up to 12:00:02, the current average data rate of the remote unit is about 17 kbps (i.e., 1 Megabit/60 seconds), which places the remote unit 212 in the IN region 406. At 12:00:30 hours, the remote unit 212 completes the transfer of 2 Megabits of data. In view of the 1 and 2 Megabit transfers, the current average data rate of the remote unit 212 at time 12:00:31 is 50 kbps (3 Megabits/60 seconds), which places the remote unit's 212 operating point in the OUT region 414. Finally, if at 12:00:45, the remote unit 212 completes the transfers of 3 Megabits of data, the current average data rate of the remote unit 212 at time 12:00:46 is about 100 kbps (i.e., 6 Megabits/60 seconds), which places the remote unit's operating point in the DROP HARD region 412. If, as time continues to pass, the remote unit 212 does not transfer any more data, the remote unit's current average data rate eventually falls through the OUT region 414 and into the IN region 406.

Figure 10:
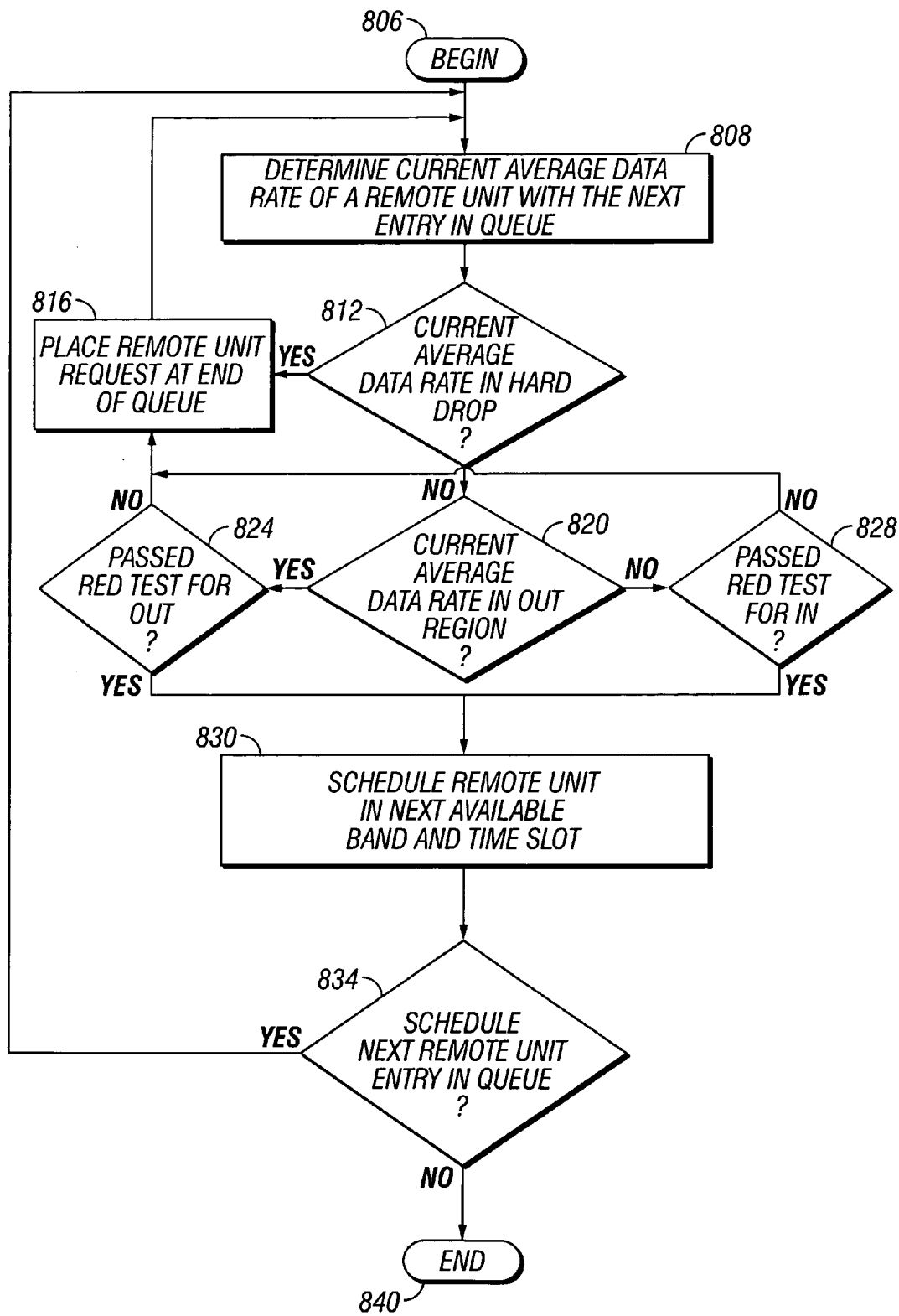
FIG. 10 is a flowchart describing the process of dynamically scheduling remote unit communications in accordance with another embodiment of the invention.

FIG. 10 is a flowchart describing a second embodiment of the process of dynamically scheduling remote unit communications. The process begins at start block 804. As noted above, in one embodiment, the hub station 210 receives demand requests from each remote unit that desires to communicate data over the system 200 (see FIG. 2) and places a corresponding entry in a FIFO queue. At block 808, the hub station 210 determines the current average data of the first remote unit corresponding to the first entry in the FIFO queue, for example, as just described.

At block 812, the hub station 210 determines if the current average data rate of the remote unit 212 classifies it as operating in the HARD DROP region 412 (see FIG. 9). If, based on the amount of data transmitted by this remote unit over the predetermined interval (e.g., past 60 seconds), the remote unit 212 is operating in the HARD DROP region 412, the process proceeds to block 816 where the hub station 210 places the current demand entry to the end in the FIFO queue. By delaying satisfaction of the demand to a later time, the hub station 210 declines to grant a bandwidth/ timeslot to the remote unit 212 at this time thereby reducing the current average data rate of the remote unit moving forward in time. In another embodiment, the demand entry is removed from queue and is not replaced with in the queue.

If, on the other hand, the remote unit 212 is not operating in the HARD DROP region 412 during the predetermined interval, the process proceeds to block 820 where the hub station 210 determines if the remote unit 212 is operating in the OUT region 414.

If, based on its current average data rate over the predetermined interval, the remote unit 212 is operating in the OUT region 414, the process continues to block 824 where the hub station 210 performs the OUT version of a pair of algorithms, such as Random Early Drop (RED) with In/Out bit (RIO). In one embodiment, the RED and RIO algorithms are executed by a gateway within the hub station. Generally, a RED algorithm computes the average queue length and, when the average queue length exceeds a certain dropping threshold, the gateway begins to randomly drop demand requests with a certain probability, where the exact probability is a function of the queue length at the hub stations.

If, based on its current average data rate over the predetermined interval, the remote unit 212 is operating in the IN region 406, the process continues to block 828 in which a second Random Early Drop (RED) algorithm is performed. Typically, the dropping threshold reflects a longer queue length for the IN packets than the OUT packets and the probability of dropping an OUT packet is higher than or equal to the probability of dropping an IN packet over the entire range of queue lengths. For further details on the RED and RIO algorithms and gateways, reference is made to Clark, D. and Fang, W., Explicit Allocation of Best Effort Packet Delivery Service, which is available via http://diffserv.lcs.mit.edu/Papers/exp-alloc-ddc-wf.pdf.

If the demand request is not passed (i.e., is dropped) by the RED algorithm in either block 824 or 828, the process returns to block 816 where the hub station 210 places the demand entry at the end of the FIFO queue or drops the request from the FIFO queue. If, on the other hand, the demand request of the remote unit 212 is passed by the RED algorithm in either block 824 or 828, the process continues to block 830.

In block 830, the hub station 210 schedules the remote unit communication. More particularly, to schedule the remote unit communication, the hub station 210 determines the bandwidth that is commensurate with the assigned data rate of the remote unit 212. Based on the assigned data rate, the hub station 210 determines the next time T at which such bandwidth is available (i.e., not already scheduled to another remote unit transmission) over a time period which allows the remote unit 212 to exchange the desired amount of data. In this embodiment, the assigned data rate preferably remains at the highest rate or rate group possible for the remote unit to adequately transfer data.

At block 834, the hub station 210 determines if a next demand entry is in the FIFO queue waiting to be scheduled. In one embodiment, the process of FIG. 10 runs continuously to handle the queue of demand entries. If another demand entry is present in the FIFO queue, the process returns to block 808 where the hub station 210 handles the demand entry, as described above. If, on the other hand, another demand entry is not present in the FIFO queue, the process terminates at block 840 or simply awaits the arrival of a next demand entry.

Figure 11:
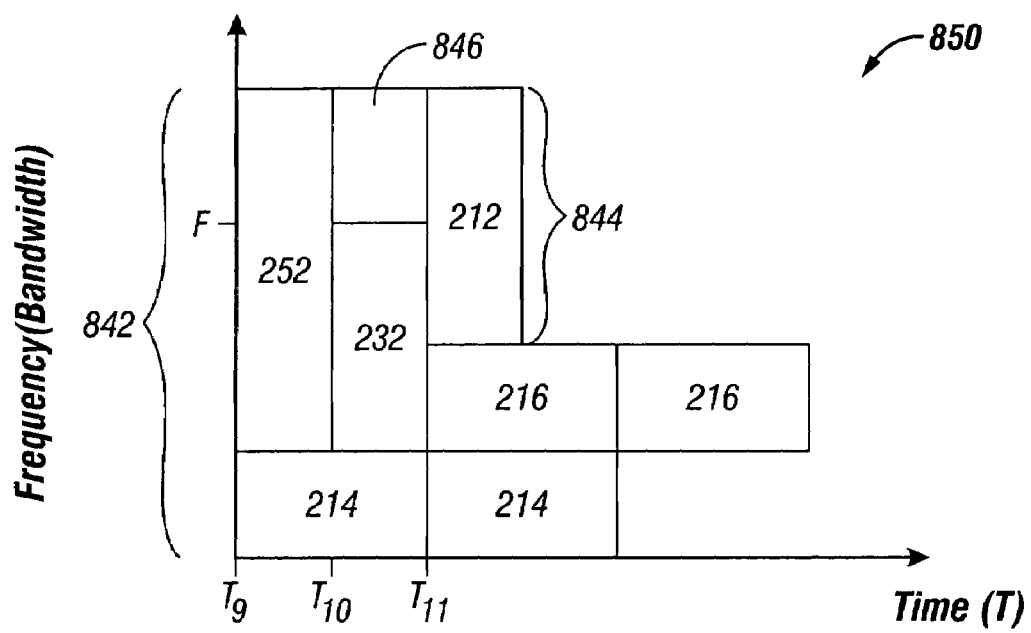
FIG. 11 is a graphical representation of the exemplifying results of the process of scheduling remote unit communications as a function of frequency and time.

FIG. 11 is a graphical representation of an exemplifying result of the process of scheduling one or more remote units as a function of frequency and time. Similar to the graph 800 (FIG. 8), the graph 850 includes a horizontal axis representing time and a vertical axis representing the frequency spectrum. The bandwidth 842 represents the entire bandwidth available for communication by the system 200. The several numbered blocks of the graph 850 represent the bandwidth and timeslot at which a correspondingly designated remote unit is scheduled to communicate data. As an example, the remote unit 252 is shown to be scheduled to transmit between times T9 and T10 at the indicated center frequency F and surrounding bandwidth. For the purpose of illustration, the bandwidth needed for the remote unit 212 is represented by the bandwidth 844.

As discussed above, to schedule the remote unit 212 request, the hub station 210 checks the time at which the required bandwidth 844 is available. At time T10, there may be an unscheduled timeslot 846 at its respective frequency and bandwidth. However, the timeslot 846 does not satisfy the necessary bandwidth for the remote unit 212. The hub station 210 does not schedule the remote unit 212 in the timeslot 846 because there is an insufficient bandwidth. Hence, the hub station 210 checks the next available timeslot to determine if the required bandwidth 844 for the remote unit 212 is available. At time T11, the hub station 210 finds the timeslot 212 having a sufficient bandwidth that is commensurate with the data rate of the remote unit 212. Accordingly, the hub station schedules the remote unit 212 at time T11 for a duration of a single timeslot or perhaps multiple time slots if necessary. As the hub station 210 continues to schedule transmissions, it may schedule another remote unit communication in the time slot 846.

In view of the foregoing, it will be appreciated that the invention overcomes the long-standing need for a method and system that optimizes frequency spectrum utilization among a plurality of communication stations. The system and method dynamically re-allocates the assigned frequency spectrum in response to changes in demand and frequency utilization.

Various alternative embodiments are encompassed within the scope of the invention. For example, in one embodiment, the assigned data rates are not quantized into several discrete data rates and instead each remote unit transmits the maximum data rate at which it is capable without regard to any specific data rate groups or simply using groups with a much smaller rate granularity. The invention can be applied to variety of operating environment aside from the one disclosed above with respect to FIG. 1 such as terrestrial environments.

The invention may be embodied in other specific forms without departing from its spirit or essential characteristics. The described embodiment is to be considered in all respects only illustrative and not restrictive. The scope of the invention is, therefore, indicated by the appended claims rather by the foregoing description. All changes that fall within the meaning and range of equivalency of the claims are to embraced within their scope.

What is claimed is:

1. A method of assigning at least a portion of the radio frequency (RF) spectrum among at least one of a plurality of RF transmitters and RF receivers, the method comprising:

monitoring a communication parameter that relates to performance of a group within the plurality of RF transmitters and receivers, the group comprising at least one of the plurality of RF transmitters and receivers;

determining, in response to the monitored communication parameter, a state of performance of the group; and allocating at least a portion of the RF spectrum from the group having best state of performance to at least one of the plurality of RF transmitters and receivers, wherein determining the state of performance of the group includes determining length of data queue of the group.

2. The method of claim 1, wherein allocating at least a portion of the RF spectrum from the group having the best state of performance includes allocating a portion of the RF spectrum from the group having the smallest length of data queue.

3. A method of assigning at least a portion of the radio frequency (RF) spectrum among at least one of a plurality of RF transmitters and RF receivers, the method comprising:

monitoring a communication parameter that relates to performance of a group within the plurality of RF transmitters and receivers, the group comprising at least one of the plurality of RF transmitters and receivers;

determining, in response to the monitored communication parameter, a state of performance of the group; and allocating at least a portion of the RF spectrum from the group having best state of performance to at least one of the plurality of RF transmitters and receivers, wherein allocating at least a portion of the RF spectrum from the group having best state of performance includes allocating a portion of the RF spectrum from the group for which data traffic is least congested.

4. A method of allocating at least a portion of the radio frequency (RF) spectrum among a plurality of RF transmitters, the method comprising:

monitoring demand of a group of transmitters within the plurality of RF transmitters, the group comprising at least one RF transmitter;

determining, in response to the monitored demand, relative data congestion of the group of transmitters; and allocating at least a portion of the RF spectrum from the group having least amount of congestion to at least one other RF transmitter.

5. The method of claim 4, further comprising adjusting demand of each of the transmitters of the group based, at least in part, on quality of service of each of the transmitters of the group.

6. The method of claim 5, wherein adjusting demand of each of the transmitters of the group includes granting at least a portion of the demand of each of the transmitters of the group.

7. The method of claim 6, further comprising determining aggregate demand of the group based, at least in part, on the adjusted demand of each of the transmitters of the group.

8. The method of claim 4, wherein monitoring demand of the group of transmitters includes receiving information representing the amount of data that each of the transmitters of the group requests to exchange.

9. The method of claim 4, wherein determining relative data congestion of the group of transmitters includes identifying the group with the smallest length of data queue.

10. The method of claim 9, wherein allocating at least a portion of the RF spectrum includes assigning a portion of the RF spectrum from the group of transmitters having the smallest length of data queue to at least one other RF transmitter.

11. The method of claim 4, further comprising comparing length of data queue of the group of transmitters with length of data queue of another group of transmitters.

12. The method of claim 4, further comprising monitoring demand of at least one other group of transmitters within the plurality of RF transmitters, the group comprising at least one RF transmitter.

13. A communication receiver that receives radio frequency (RF) signals from a plurality of RF transmitters, the communication receiver accessing a processor that is programmed with instructions that when executed perform a method comprising:
  monitoring demand of a group of transmitters within the plurality of RF transmitters, the group comprising at least one RF transmitter;
  determining, in response to the monitored demand, relative data congestion of the group of transmitters; and
  allocating at least a portion of the RF spectrum from a group having a least amount of congestion to at least one other RF transmitter.

14. The receiver of claim 13, wherein the method further comprises adjusting demand of each of the transmitters of the group based, at least in part, on quality of service of each of the transmitters of the group.

15. The receiver of claim 14, wherein adjusting demand of each of the transmitters of the group includes granting at least a portion of the demand of each of the transmitters of the group.

16. The receiver of claim 15, wherein the method further comprises determining aggregate demand of the group based, at least in part, on the adjusted demand of each of the transmitters of the group.

17. The receiver of claim 13, wherein monitoring demand of the group of transmitters includes receiving information representing the amount of data that each of the transmitters of the group requests to exchange.

18. The receiver of claim 13, wherein determining relative data congestion of the group of transmitters includes identifying the group with the smallest length of data queue.

19. The receiver of claim 18, wherein allocating at least a portion of the RF spectrum includes assigning a portion of the RF spectrum from the group of transmitters having the smallest length of data queue to at least one other RF transmitter.

20. The receiver of claim 13, wherein the method further comprises comparing length of data queue of the group of transmitters with length of data queue of another group of transmitters.

21. The receiver of claim 13, wherein the method further comprises monitoring demand of at least one other group of transmitters within the plurality of RF transmitters, the group comprising at least one RF transmitter.

22. A system for allocating at least a portion of the radio frequency (RF) spectrum among a plurality of RF transmitters, the system comprising:
  a plurality of RF transmitters each configured to transmit data representing respective demand to communicate data; and
  a receiver in communication with the plurality of RF transmitters, the receiver being configured to monitor the demand of a group within the plurality of RF transmitters, the group comprising at least one RF transmitter, wherein the receiver is further configured to re-allocate a portion of the RF spectrum from the group of RF transmitters having smallest demand to at least one other RF transmitter, wherein each RF transmitter is configured to periodically transmit data representing the respective demand to the receiver over a dedicated RF channel.

23. The system of claim 22, wherein the receiver is configured to measure a signal-to-noise ratio of the dedicated RF channel of at least one of the plurality of RF transmitters and assign an increased data rate to the at least one of the plurality of RF transmitters in the event that the measured signal-to-noise ratio is above a predetermined threshold.

24. The system of claim 22, wherein the receiver is configured to measure a signal-to-noise ratio of the dedicated RF channel of at least one of the plurality of RF transmitters and assign a reduced data rate to the at least one of the plurality of RF transmitters in the event that the measured signal-to-noise ratio is below a predetermined threshold.

25. The system of claim 22, wherein the receiver is configured to measure a signal-to-noise ratio of the dedicated RF channel of at least one of the plurality of RF transmitters and maintain a currently assigned data rate for the at least one of the plurality of RF transmitters in the event that the measured signal-to-noise ratio is within a predetermined range.

26. The system of claim 22, wherein the receiver is configured to reallocate the portion of the RF spectrum in a stepwise manner by a predetermined amount of bandwidth.

27. A communication system programmed with instructions that when executed by a processor perform a method of assigning at least a portion of the radio frequency (RF) spectrum among at least one of a plurality of RF transmitters and RF receivers, the method comprising:
  monitoring a communication parameter that relates to performance of a group within the plurality of RF transmitters and receivers, the group comprising at least one of the plurality of RF transmitters and receivers;
  determining, in response to the monitored communication parameter, a state of performance of the group; and
  allocating at least a portion of the RF spectrum from the group having best state of performance to at least one of the plurality of RF transmitters and receivers, wherein determining the state of performance of the group includes determining length of data queue of the group.

28. A system for allocating at least a portion of the radio frequency (RF) spectrum among a plurality of RF transmitters, the system comprising:
  means for monitoring demand of a group of transmitters within the plurality of RF transmitters, the group comprising at least one RF transmitter;
  means for determining, in response to the monitored demand, relative data congestion of the group of transmitters; and
  means for allocating at least a portion of the RF spectrum from the group having least amount of congestion to at least one other RF transmitter.

29. A method of assigning a portion of the radio frequency (RF) spectrum among a plurality of transmitters, the method comprising:

monitoring demand of at least first and second groups of transmitters, the first group operating at an average data rate that is different than the data rate of the second group of transmitters;

adjusting the demand of each of the at least first and second groups of transmitters based at least in part on a quality of service that is commensurate with each transmitter of the first and second groups of transmitters;

determining, based at least in part or the adjusted demand, the group of transmitters that is least congested;

reducing the size of RF bandwidth that is assigned to the least congested group of transmitters; and increasing the size of RF bandwidth that is assigned to the other group of transmitters.

30. The method as defined in claim 29, wherein determining the group of transmitters that is least congested includes identifying the group of transmitters that has the smallest data queue.

* * * * *

UNITED STATES PATENT AND TRADEMARK OFFICE
CERTIFICATE OF CORRECTION

PATENT NO. : 6,982,969 B2
APPLICATION NO. : 09/407645
DATED : January 3, 2006
INVENTOR(S) : Carneal et al.

It is certified that error appears in the above-identified patent and that said Letters Patent is hereby corrected as shown below:

Title page Item (56) column 2 (Other Publications), line 4, line 4, delete "pps." and insert -- pp.-- therefore;

Title page Item (56) column 1 (Other Publications), line 4, delete "pps." and insert --pp.-- therefore;

Title page Item (56) column 1 (Other Publications), line 9, delete "pps." and insert -- pp.-- therefore;

At column 5, line 54, delete "Is" and insert --is-- therefore;

At column 6, line 37, delete "parameters" and insert --parameter-- therefore;

At column 6, line 49, delete "330" and insert --300-- therefore;

At column 7, line 36, after "of" insert --the demand--;

At column 9, line 10, delete "lest" and insert --least-- therefore;

At column 12, line 57, delete "of" and insert --or-- therefore;

At column 13, line 5, delete "date" and insert --data-- therefore;

At column 18, delete "reallocate" and insert --re-allocate-- therefore;

At column 20, delete "or" and insert --on-- therefore;

Signed and Sealed this

Fifth Day of December, 2006

JON W. DUDAS
*Director of the United States Patent and Trademark Office*

UNITED STATES PATENT AND TRADEMARK OFFICE
CERTIFICATE OF CORRECTION

PATENT NO. : 6,982,969 B2
APPLICATION NO. : 09/407645
DATED : January 3, 2006
INVENTOR(S) : Carneal et al.

It is certified that error appears in the above-identified patent and that said Letters Patent is hereby corrected as shown below:

Title page Item (56) column 2 (Other Publications), line 4, line 4, delete "pps." and insert -- pp.-- therefore;

Title page Item (56) column 1 (Other Publications), line 4, delete "pps." and insert --pp.-- therefore;

Title page Item (56) column 1 (Other Publications), line 9, delete "pps." and insert -- pp.-- therefore;

At column 5, line 54, delete "Is" and insert --is-- therefore;

At column 6, line 37, delete "parameters" and insert --parameter-- therefore;

At column 6, line 49, delete "330" and insert --300-- therefore;

At column 7, line 36, after "of" insert --the demand--;

At column 9, line 10, delete "lest" and insert --least-- therefore;

At column 12, line 57, delete "of" and insert --or-- therefore;

At column 13, line 5, delete "date" and insert --data-- therefore;

At column 18, line 35, delete "reallocate" and insert --re-allocate-- therefore;

UNITED STATES PATENT AND TRADEMARK OFFICE
CERTIFICATE OF CORRECTION

PATENT NO. : 6,982,969 B2
APPLICATION NO. : 09/407645
DATED : January 3, 2006
INVENTOR(S) : Carneal et al.

It is certified that error appears in the above-identified patent and that said Letters Patent is hereby corrected as shown below:

At column 20, line 1, delete "or" and insert --on-- therefore;

This certificate supersedes Certificate of Correction issued December 5, 2006.

Signed and Sealed this

Second Day of January, 2007

JON W. DUDAS
*Director of the United States Patent and Trademark Office*